US010639857B1

(12) United States Patent
Hafenrichter et al.

(10) Patent No.: US 10,639,857 B1
(45) Date of Patent: May 5, 2020

(54) MAGNETIC COMPACTION BLANKET FOR COMPOSITE STRUCTURE CURING

(71) Applicant: The Boeing Company, Chicago, IL (US)

(72) Inventors: Joseph Lawrence Hafenrichter, Seattle, WA (US); John Ralph Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 860 days.

(21) Appl. No.: 15/225,617

(22) Filed: Aug. 1, 2016

Related U.S. Application Data

(62) Division of application No. 13/762,930, filed on Feb. 8, 2013, now Pat. No. 9,403,328.

(51) Int. Cl.
*B25B 11/00* (2006.01)
*F16B 1/00* (2006.01)
*B29C 73/12* (2006.01)
*B29C 73/30* (2006.01)
*B29C 65/48* (2006.01)
*B29C 65/78* (2006.01)
(Continued)

(52) U.S. Cl.
CPC ............ *B29C 73/12* (2013.01); *B29C 73/30* (2013.01); *B25B 11/002* (2013.01); *B29C 37/0075* (2013.01); *B29C 65/483* (2013.01); *B29C 65/785* (2013.01); *B29L 2031/3076* (2013.01); *B32B 7/025* (2019.01); *B32B 2037/1081* (2013.01); *F16B 2001/0035* (2013.01)

(58) Field of Classification Search
CPC ......... B29C 73/10; B29C 73/12; B29C 73/30; B29C 65/785; B29C 66/8244; B32B 2037/1081; B32B 7/025; F16B 2001/0035; B25B 11/002
USPC ........ 156/94, 272.2, 297, 307.1, 391, 583.3; 219/243
See application file for complete search history.

(56) References Cited

U.S. PATENT DOCUMENTS 2,713,379 A * 7/1955 Sisson .................... B21D 39/03
100/917
2,957,261 A * 10/1960 Moskowitz ........... H01F 7/0252
116/28 R
(Continued)

FOREIGN PATENT DOCUMENTS

DE 3536982 A1 * 4/1987 ............... B25B 9/00
GB 571598 A * 8/1945 ............. B29C 73/30
(Continued)

OTHER PUBLICATIONS

Machine translation of Japanese Patent Publication No. JP-2001346890A, originally published Dec. 18, 2001, 5 pages (Year: 2001).*

(Continued)

*Primary Examiner* — Philip C Tucker
*Assistant Examiner* — Brian R Slawski
(74) *Attorney, Agent, or Firm* — Yee & Associates, P.C.

(57) ABSTRACT

A method and apparatus for reworking a structure. A compaction blanket comprising a number of magnets is placed on the structure. A heat source is applied on the compaction blanket, wherein the compaction blanket is between the heat source and a rework of the structure and heat is conducted from the heat source through the compaction blanket to heat the rework.

20 Claims, 9 Drawing Sheets

(51) Int. Cl.
  *B29C 65/00* (2006.01)
  *B32B 37/10* (2006.01)
  *B32B 7/025* (2019.01)
  *B32B 37/00* (2006.01)
  B29C 37/00 (2006.01)
  B29L 31/30 (2006.01)

(56) References Cited

U.S. PATENT DOCUMENTS

| | | | |
|---|---|---|---|
| 3,610,459 A * | 10/1971 | Hanson | A47G 19/10 |
| | | | 206/818 |
| 4,802,523 A | 2/1989 | Scholten et al. | |
| 5,039,003 A | 8/1991 | Gordon et al. | |
| 5,984,855 A | 11/1999 | DiNapoli | |
| 7,187,261 B2 * | 3/2007 | Cassar | B23Q 3/1546 |
| | | | 335/303 |
| 8,980,029 B1 | 3/2015 | Nigro et al. | |
| 9,403,328 B1 | 8/2016 | Hafenrichter et al. | |
| 2002/0029847 A1 * | 3/2002 | Matsui | B29C 66/8244 |
| | | | 156/306.9 |
| 2006/0191909 A1 * | 8/2006 | Powell | B29C 65/7841 |
| | | | 219/633 |
| 2007/0108201 A1 | 5/2007 | Vinegar et al. | |
| 2010/0071192 A1 * | 3/2010 | Sarh | B21J 15/14 |
| | | | 29/525.06 |
| 2011/0139769 A1 | 6/2011 | Miller et al. | |
| 2012/0145702 A1 | 6/2012 | Miller et al. | |
| 2013/0312895 A1 * | 11/2013 | Morehead | B64F 5/40 |
| | | | 156/64 |
| 2014/0008009 A1 * | 1/2014 | Sana | B29C 70/32 |
| | | | 156/213 |
| 2014/0356053 A1 * | 12/2014 | Urayama | B29C 66/73921 |
| | | | 403/270 |

FOREIGN PATENT DOCUMENTS

JP       2001346890 A  * 12/2001
WO   WO-2012090468 A1 *  7/2012  ............. B29C 70/32

OTHER PUBLICATIONS

Office Action, dated Dec. 9, 2015, regarding U.S. Appl. No. 13/762,930, 25 pages.

Notice of Allowance, dated Mar. 29, 2016, regarding U.S. Appl. No. 13/762,930, 9 pages.

* cited by examiner

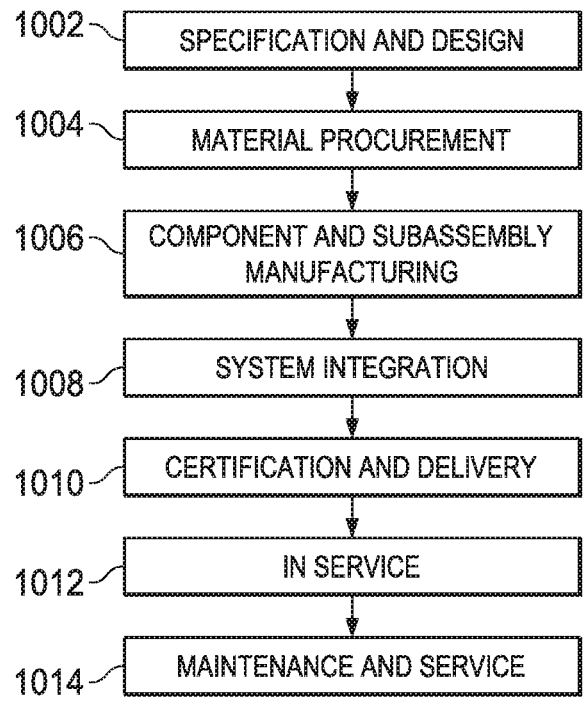
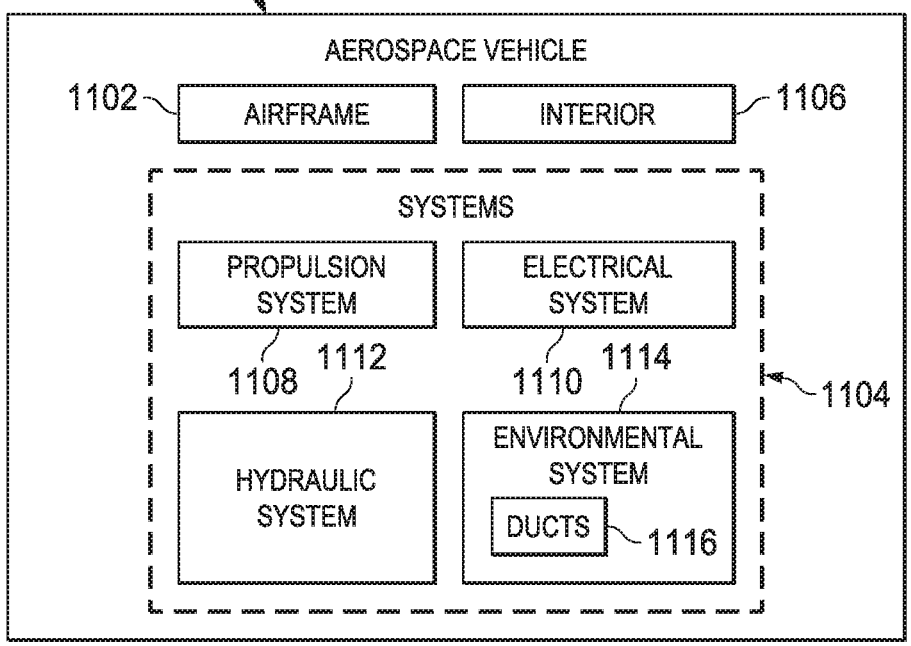

MAGNETIC COMPACTION BLANKET FOR COMPOSITE STRUCTURE CURING

CROSS-REFERENCE TO RELATED APPLICATION(S)

This application is a divisional of and claims the benefit of priority to U.S. patent application Ser. No. 13/762,930, filed Feb. 8, 2013, now U.S. Pat. No. 9,403,328, issued Aug. 2, 2016, the entire contents of which are incorporated herein by referenced.

BACKGROUND INFORMATION

1. Field

The present disclosure relates generally to systems and methods for reworking structures made of composite materials. More particularly, the present disclosure relates to a magnetic compaction blanket and use of a magnetic compaction blanket for curing composite structures.

2. Background

Composite materials may be tough, lightweight materials, created by combining two or more dissimilar components. For example, a composite material may include fibers and resins. Fibers and resins may be combined and cured to form a composite material. Composite materials may be used for a variety of applications. For example, various components on aircraft and other vehicles may be made of composite materials. As one example, ducts forming part of the environmental control system on an aircraft may be made of composite materials.

Inconsistencies in a structure made of composite materials may affect the performance of the structure in undesired ways. Inconsistencies may include, for example, scratches, gouges, cuts, punctures, and other inconsistencies. Such inconsistencies may occur during manufacturing, transportation, storage, use, or maintenance of structures made of composite materials.

In many cases, inconsistencies in structures made of composite materials may be reworked to restore the performance of the structure. Reworking a structure made of composite materials may include placing an uncured composite material on the structure in the area to be reworked. The uncured composite material then may be cured in place on the structure and finished as desired to complete the reworking of the structure.

Reworking ducts and other structures on aircraft that are made of composite materials may pose particular challenges. For example, access to the duct may be limited. Curing rework of such ducts at room temperature may take longer than desired. Heated curing of such rework may require a relatively high level of worker skill or may result in rework of undesired quality.

Therefore, it would be desirable to have a method and apparatus that takes into account at least some of the issues discussed above, as well as possibly other issues.

SUMMARY

An illustrative embodiment of the present disclosure provides a method for reworking a structure. A compaction blanket comprising a number of magnets is placed on the structure. A heat source is applied on the compaction blanket, wherein the compaction blanket is between the heat source and a rework of the structure and heat is conducted from the heat source through the compaction blanket to heat the rework.

Another illustrative embodiment of the present disclosure provides an apparatus comprising a support structure and a plurality of magnets. The plurality of magnets are attached to the support structure and arranged to form a compaction blanket.

Another illustrative embodiment of the present disclosure provides a method for making a magnetic compaction blanket. An adhesive is applied on a surface of a magnetic backplane. A plurality of magnets are placed on the surface such that the plurality of magnets are attached to the surface by the adhesive and magnetically coupled to the magnetic backplane.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof will best be understood by reference to the following detailed description of an illustrative embodiment of the present disclosure when read in conjunction with the accompanying drawings, wherein:

FIG. 10 is an illustration of a block diagram of an aerospace vehicle manufacturing and service method in accordance with an illustrative embodiment; and FIG. 11 is an illustration of a block diagram of an aerospace vehicle in which an illustrative embodiment may be implemented.

DETAILED DESCRIPTION

Figure 1:
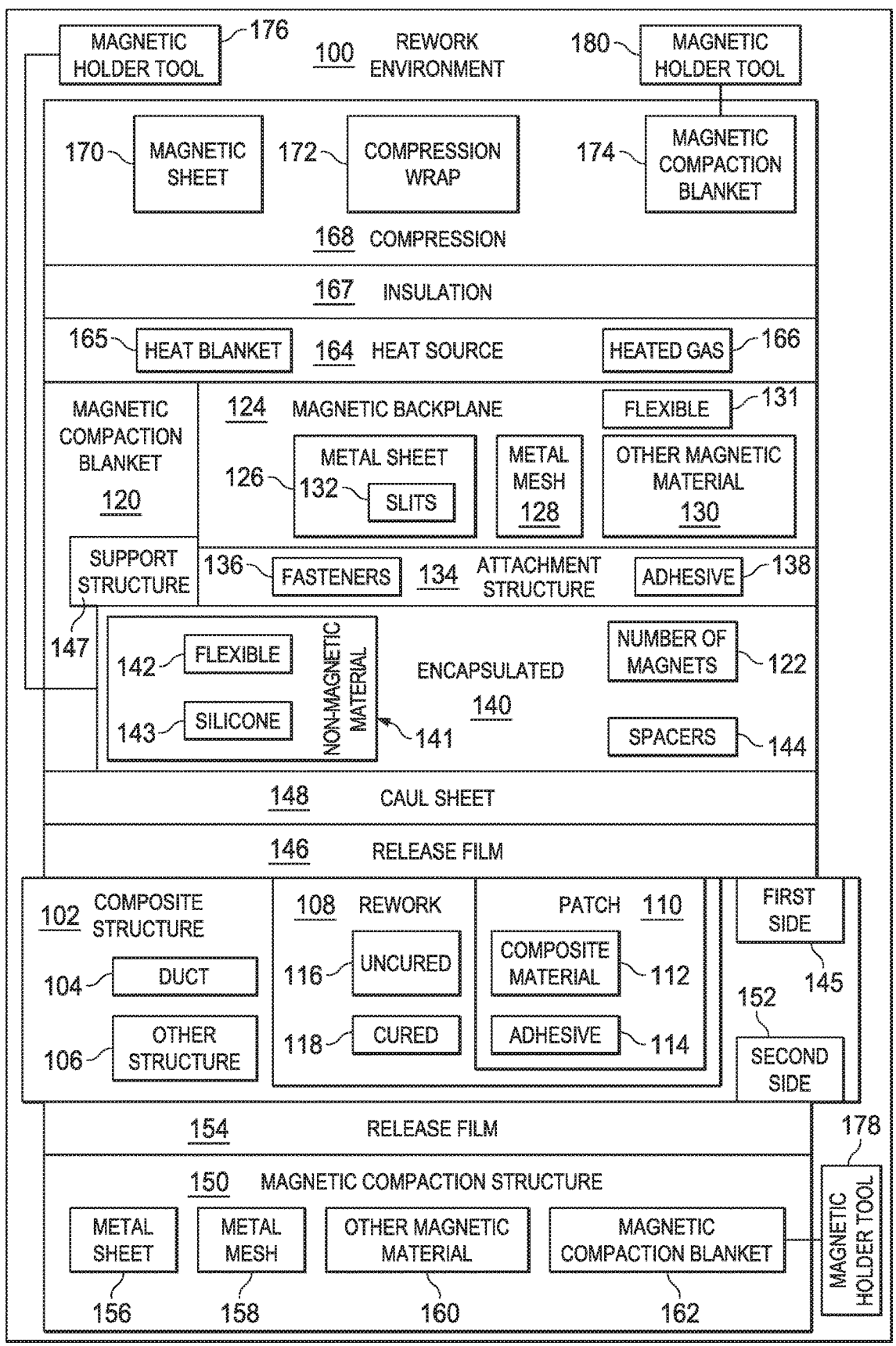
FIG. 1 is an illustration of a block diagram of a rework environment in accordance with an illustrative embodiment.

The different illustrative embodiments recognize and take into account a number of different considerations. "A number", as used herein with reference to items, means one or more items. For example, "a number of different considerations" are one or more different considerations.

The different illustrative embodiments recognize and take into account that ducts made of composite materials may be used in the environmental control systems on aircraft. Inconsistencies in the composite materials may affect the performance of the ducts in undesired ways. Therefore, it may be desirable to rework inconsistencies in the ducts to restore performance. In particular, it may be desirable to rework inconsistencies in the ducts without removing the ducts from the aircraft.

The different illustrative embodiments recognize and take into account that reworking ducts on aircraft may pose challenges. For example, access around and to the inside of a duct in the area of an inconsistency may be limited.

The different illustrative embodiments recognize and take into account that a typical method for reworking a duct may include placing a patch of uncured composite material on the duct in the area to be reworked. In this example, the patch of uncured composite material may be referred to as a wet-layup. The patch of uncured composite material then may be cured to complete the rework and restore the performance of the duct.

The different illustrative embodiments recognize and take into account that a patch of uncured composite material used in wet-layup rework of a duct or other structure on an aircraft may be cured at room temperature. However, curing composite materials at room temperature takes a relatively long time. This long processing time may cause excessive work in progress to build up in an aircraft maintenance facility or other area where the rework is performed. The relatively long processing time desired for room temperature curing thus may increase costs and may increase the likelihood that further inconsistencies calling for further rework may occur. Furthermore, aircraft assembly or other maintenance jobs may be held up while rework is held up for an undesired amount of time in the curing process.

The different illustrative embodiments recognize and take into account that applying heat and compaction to the uncured composite material applied during rework may speed up the curing process. For example, vacuum pressure may be used to apply compaction to the patch of uncured composite material during such heated curing. However, the resins currently used in the patches of uncured composite material used for wet-layup rework of inconsistence may have relatively low viscosity. These resins may bleed out of the rework area during heated curing at elevated pressure levels. The resins may bleed out at elevated cure temperatures because the vacuum pressure used for compaction also evacuates the low viscosity resin from the rework area. Bleeding out of the resins during curing may result in unacceptable rework that may need to be removed and reprocessed.

The different illustrative embodiments recognize and take into account that, as an alternative to vacuum pressure, duct rework may be wrapped with thermal shrink tape to provide compaction during heated curing. For example, an area on the duct being reworked may be wrapped with several plies of heat shrink tape or film. Compaction force is derived by manually applying hot air with a heat gun to the shrink tape, causing the tape to contract circumferentially, thereby generating compaction force on the rework. However, unless the operator of the heat gun is highly skilled, either too little or too much heat may be applied. Applying too little heat may result in too little compaction force resulting in an unconsolidated patch. Applying too much heat may result in too much compaction force resulting in the duct being crushed. Thus, extensive training may be required to teach technicians to correctly apply heat shrink tape to apply compaction pressure.

In areas where accessibility is available, tooling sheets may be clamped on each side of the rework to provide compaction during curing. However, adequate access to the rework area may not be available. For example, this method may not work when a tube configuration like a duct is being reworked. Furthermore, creating the pressure application pads may be skill intensive and time consuming.

Illustrative embodiments provide a rework process, apparatus, and fabrication methodology that enable the repair of fiber composite ducts and other structures using a magnetic compaction blanket. The magnetic compaction blanket may be used to generate compaction force during curing of adhesives and composite materials. The magnetic compaction blanket may comprise a set of permanent magnets joined with a metallic backplane or encapsulated in silicone. Illustrative embodiments may be used to produce higher quality reworking of ducts and other structures made of composite materials with shorter processing times.

Turning now to FIG. 1, an illustration of a block diagram of a rework environment is depicted in accordance with an illustrative embodiment. Rework environment 100 in FIG. 1 may be used during manufacturing or maintenance of any vehicle or other platform or during manufacturing or maintenance of a part for a vehicle or other platform. For example, without limitation, rework environment 100 may be used during manufacturing or maintenance of aerospace vehicle 1100 in FIG. 11 below or during manufacturing or maintenance of a part for aerospace vehicle 1100.

Rework environment 100 may be configured for reworking composite structure 102. Composite structure 102 may be any structure made of a composite material. For example, without limitation, composite structure 102 may be duct 104 or other structure 106. Duct 104 may be a duct in an environmental control system or other system on an aircraft or other vehicle. In another example, other structure 106 may be a structure that is not made of a composite material.

Composite structure 102 may include inconsistencies. Inconsistencies in composite structure 102 may affect the performance of composite structure 102 in undesired ways. Such inconsistencies may include, for example, without limitation, scratches, gouges, cuts, punctures, and other inconsistencies. Such inconsistencies may occur during manufacturing, transportation, storage, use, or maintenance of composite structure 102.

Rework 108 of inconsistencies in composite structure 102 may restore the performance of composite structure 102. Rework 108 of composite structure 102 may include patch 110. Patch 110 may comprise composite material 112 and adhesive 114 applied in an area of rework 108 on composite structure 102. For example, without limitation, composite material 112 may include fibers and resins that may be combined and cured to form composite material 112. Patch 110 may be uncured 116 when applied to composite structure 102. Patch 110 may be cured 118 to complete rework 108 of composite structure 102. Heating is one way to cure uncured 116 composite material 112 and other uncured 116 materials in rework 108. In accordance with an illustrative embodiment, patch 110 may be cured 118 at an elevated pressure and temperature level to complete rework 108 of composite structure 102 in less time than if patch 110 were cured 118 at room temperature.

In accordance with an illustrative embodiment, magnetic compaction blanket 120 may be used to provide compaction of patch 110 during curing of rework 108 on composite structure 102. In accordance with an illustrative embodiment, including in the claims, an object is "magnetic" if it is attracted by a magnet.

Magnetic compaction blanket 120 includes number of magnets 122. For example, number of magnets 122 may include a number of permanent magnets. Number of magnets 122 may include rare-earth magnets or ferrite magnets. Rare-earth magnets may be preferred. For example, without limitation, number of magnets 122 may include iron-boron neodymium magnets, samarium cobalt magnets, other types of magnets, or various types of magnets in any appropriate combination. Number of magnets 122 may be of any appropriate size and shape.

Number of magnets 122 may be attached to magnetic backplane 124 to form magnetic compaction blanket 120. Magnetic backplane 124 may be made of any appropriate magnetic material. For example, without limitation, magnetic backplane 124 may be formed of metal sheet 126, metal mesh 128, other magnetic material 130, or any appropriate combination of magnetic materials. For example, without limitation, other magnetic material 130 may include steel shot or ferromagnetic powder.

Magnetic backplane 124 may be shaped so that magnetic compaction blanket 120 may conform to the shape of composite structure 102 in the area of rework 108. For example, magnetic backplane 124 may be flexible 131 to conform to the shape of composite structure 102. In this case, magnetic backplane 124 may be made of a flexible material or structure. For example, without limitation, magnetic backplane 124 may comprise a ferromagnetic metal sheet 126 with slits 132. Slits 132 may be formed in metal sheet 126 to make magnetic backplane 124 flexible.

Number of magnets 122 may be positioned in any appropriate arrangement on magnetic backplane 124 and may be attached to magnetic backplane 124 using any appropriate attachment structure 134. For example, without limitation, number of magnets 122 may be attached to a surface of magnetic backplane 124 using any appropriate fasteners 136, adhesive 138, or both. If magnetic backplane 124 is flexible 131, number of magnets 122 may be positioned on and attached to magnetic backplane 124 in any appropriate manner so as to provide a desired amount of flexibility for magnetic compaction blanket 120.

Number of magnets 122 in magnetic compaction blanket 120 may be encapsulated 140. For example, number of magnets 122 may be encapsulated 140 in any appropriate non-magnetic material 141. Non-magnetic material 141 may be flexible 142. For example, without limitation, number of magnets 122 may be encapsulated 140 in silicone 143.

Magnetic backplane 124 and non-magnetic material 141 in which number of magnets 122 are encapsulated 140 are examples of support structure 147 for number of magnets 122. Support structure 147 may comprise any appropriate structure to which number of magnets 122 may be attached to form magnetic compaction blanket 120. Number of magnets 122 may be attached to support structure 147 in any appropriate manner to maintain the desired arrangement of number of magnets 122 in magnetic compaction blanket 120.

Number of magnets 122 may be arranged in magnetic compaction blanket 120 in any appropriate configuration. For example, spacers 144 may be placed between number of magnets 122 in magnetic compaction blanket 120 to maintain the desired configuration of number of magnets 122 in magnetic compaction blanket 120. Spacers 144 may be of any appropriate size and shape to maintain the desired configuration of number of magnets 122 in magnetic compaction blanket 120. Spacers 144 may be made of any appropriate non-magnetic material 141. Encapsulation of number of magnets 122 may maintain the desired configuration of number of magnets 122 in magnetic compaction blanket 120. In this case, for example, without limitation, spacers 144 may comprise silicone 143 or another appropriate non-magnetic material 141 used to encapsulate number of magnets 122.

In use, magnetic compaction blanket 120 may be placed on composite structure 102 in the area of rework 108 to be cured. For example, magnetic compaction blanket 120 may be placed on first side 145 of composite structure 102 in the area of rework 108. Before placing magnetic compaction blanket 120 on composite structure 102, release film 146 may be applied on first side 145 of composite structure 102 in the area of rework 108. Caul sheet 148 may be placed over release film 146. Magnetic compaction blanket 120 then may be placed over caul sheet 148. Release film 146 and caul sheet 148 may be made of any appropriate material and applied in any appropriate manner as will be known to those skilled in the relevant art.

Magnetic compaction structure 150 may be placed on second side 152 of composite structure 102 such that area of rework 108 on composite structure 102 is positioned between magnetic compaction structure 150 and magnetic compaction blanket 120. Release film 154 may be placed on second side 152 of composite structure 102 before magnetic compaction structure 150 is placed on composite structure 102. Magnetic compaction structure 150 then may be placed on composite structure 102 over release film 154. Release film 154 may be made of any appropriate material and applied in any appropriate manner as will be known to those skilled in the relevant art. Release film 154 may be the same as or different from release film 146.

Magnetic compaction structure 150 may be made of any appropriate magnetic material and may have any appropriate structure such that when magnetic compaction structure 150 is placed on composite structure 102, magnetic attraction between magnetic compaction blanket 120 on first side 145 of composite structure 102 and magnetic compaction structure 150 on second side 152 of composite structure 102 pulls magnetic compaction blanket 120 and magnetic compaction structure 150 toward each other to compact rework 108 between magnetic compaction blanket 120 and magnetic compaction structure 150 with a desired amount of force. For example, magnetic compaction structure 150 may comprise metal sheet 156, metal mesh 158, other magnetic material 160, or any appropriate combination of magnetic materials. Alternatively, or in addition, magnetic compaction structure 150 may comprise magnetic compaction blanket 162. Magnetic compaction blanket 162 may have the same, similar, or different structure from magnetic compaction blanket 120 on first side 145 of composite structure 102. In any case, magnetic compaction structure 150 may be shaped so that magnetic compaction structure 150 may conform to the shape of second side 152 of composite structure 102 on which magnetic compaction structure 150 is placed. For example, magnetic compaction structure 150 may be flexible to conform to the shape of second side 152 of composite structure 102.

Heat source 164 may be applied on magnetic compaction blanket 120 on first side 145 of composite structure 102.

Heat from heat source 164 may be conducted through magnetic compaction blanket 120 to cure rework 108 on composite structure 102.

Heat source 164 may comprise any appropriate source of heat. For example, without limitation, heat source 164 may comprise heat blanket 165, heated gas 166, any other appropriate source of heat, or any appropriate combination of heat sources. Heat blanket 165 may be configured to provide heat to magnetic compaction blanket 120 by conduction heating. Heated gas 166 may provide heat to magnetic compaction blanket 120 by convection heating. For example, without limitation, heated gas 166 may comprise forced heated air or another appropriate gas that is provided by a convection oven or other appropriate source of heated gas 166.

When heat source 164 is heat blanket 165, insulation 167 may be placed over heat blanket 165 such that heat blanket 165 is positioned between insulation 167 and magnetic compaction blanket 120. Insulation 167 may be made of any appropriate thermal insulating material and may have any appropriate form for increasing the amount of heat that may be delivered from heat blanket 165 through magnetic compaction blanket 120 to rework 108 when insulation 167 is used. For example, without limitation, insulation 167 may or may not be a part of heat blanket 165.

When heat source 164 is heat blanket 165, compression 168 may be applied to heat blanket 165 such that heat blanket 165 is positioned between compression 168 and magnetic compaction blanket 120. For example, compression 168 may be applied over insulation 167 on heat blanket 165. Compression 168 may be applied to heat blanket 165 to increase the amount of heat that may be delivered from heat blanket 165 through magnetic compaction blanket 120 to rework 108.

Any appropriate structure or method may be used to provide compression 168 with a desired amount of force. For example, without limitation, compression 168 may be provided by magnetic sheet 170, compression wrap 172, magnetic compaction blanket 174, or in any other appropriate manner.

Magnetic sheet 170 may comprise a sheet of any appropriate magnetic material in any appropriate form. Magnetic sheet 170 may be placed such that heat blanket 165 is positioned between magnetic sheet 170 and magnetic compaction blanket 120. Magnetic attraction between magnetic sheet 170 and number of magnets 122 in magnetic compaction blanket 120 may pull magnetic sheet 170 toward magnetic compaction blanket 120 to compress heat blanket 165 between magnetic sheet 170 and magnetic compaction blanket 120 with a desired amount of force.

Compression wrap 172 may be placed such that heat blanket 165 is positioned between compression wrap 172 and magnetic compaction blanket 120. Compression wrap 172 may be configured to compress heat blanket 165 between compression wrap 172 and magnetic compaction blanket 120 with a desired amount of force.

Magnetic compaction blanket 174 may have the same, similar, or different structure from magnetic compaction blanket 120 and magnetic compaction blanket 162. Magnetic compaction blanket 174 may be placed such that heat blanket 165 is positioned between magnetic compaction blanket 174 and magnetic compaction blanket 120. Magnetic attraction between magnetic compaction blanket 174 and magnetic compaction blanket 120 may pull magnetic compaction blanket 174 toward magnetic compaction blanket 120 to compress heat blanket 165 between magnetic compaction blanket 174 and magnetic compaction blanket 120 with a desired amount of force.

Magnetic holder tool 176 may be used to place magnetic compaction blanket 120 in the desired position on composite structure 102. Magnetic holder tool 178 may be used to place magnetic compaction blanket 162 in the desired position on composite structure 102. Magnetic holder tool 180 may be used to place magnetic compaction blanket 174 in the desired position. In general, magnetic holder tools 176, 178, and 180 may be used to move magnetic compaction blankets 120, 162, and 174, respectively, when magnetic compaction blankets 120, 162, and 174 are formed in a manner such that magnetic compaction blankets 120, 162, and 174 may require support when magnetic compaction blankets 120, 162, and 174 are not placed on another structure. For example, without limitation, magnetic holder tools 176, 178, and 180 may be used to move magnetic compaction blankets 120, 162, and 174, respectively, when magnetic compaction blankets 120, 162, and 174 are formed of number of magnets 122 encapsulated 140 in flexible 142 non-magnetic material 141 and when number of magnets 122 are not supported by magnetic backplane 124. In this case, one or more of magnetic holder tools 176, 178, and 180 may be made of a sheet or other structure of any appropriate magnetic material that may be relatively stiff to provide support for magnetic compaction blankets 120, 162, and 174 when they are moved. Magnetic holder tools 176, 178, and 180 may be the same, similar, or different from each other.

For example, magnetic compaction blanket 120, 162, or 174 may be placed on corresponding magnetic holder tool 176, 178, or 180. Magnetic compaction blanket 120, 162, or 174 may be held in place on corresponding magnetic holder tool 176, 178, or 180 by magnetic attraction between magnetic compaction blanket 120, 162, or 174 and corresponding magnetic holder tool 176, 178, or 180. Magnetic compaction blanket 120, 162, or 174 then may be moved on corresponding magnetic holder tool 176, 178, or 180 and placed in a desired position, such as a desired position on composite structure 102. Magnetic holder tool 176, 178, or 180 may be removed from the corresponding magnetic compaction blanket 120, 162, or 174 after magnetic compaction blanket 120, 162, or 174 is placed in the desired position.

The illustration of FIG. 1 is not meant to imply physical or architectural limitations to the manner in which an illustrative embodiment may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, the type and arrangement of number of magnets 122 in magnetic compaction blanket 120 as well as the type and characteristics of magnetic compaction structure 150 and compression 168 may be selected to achieve a desired level of compression on rework 108 during curing. The use of magnetic compaction structure 150, compression 168, or other structures or combinations of structures shown in FIG. 1 may not be required in all applications. For example, without limitation, in some applications magnetic compaction blanket 120 may be pulled by magnetic attraction toward magnetic material present within or on composite structure 102 to provide a desired level of compression without using magnetic compaction structure 150. Magnetic compaction blanket 120 may be used for reworking structures that are not made of composite materials.

Figure 2:
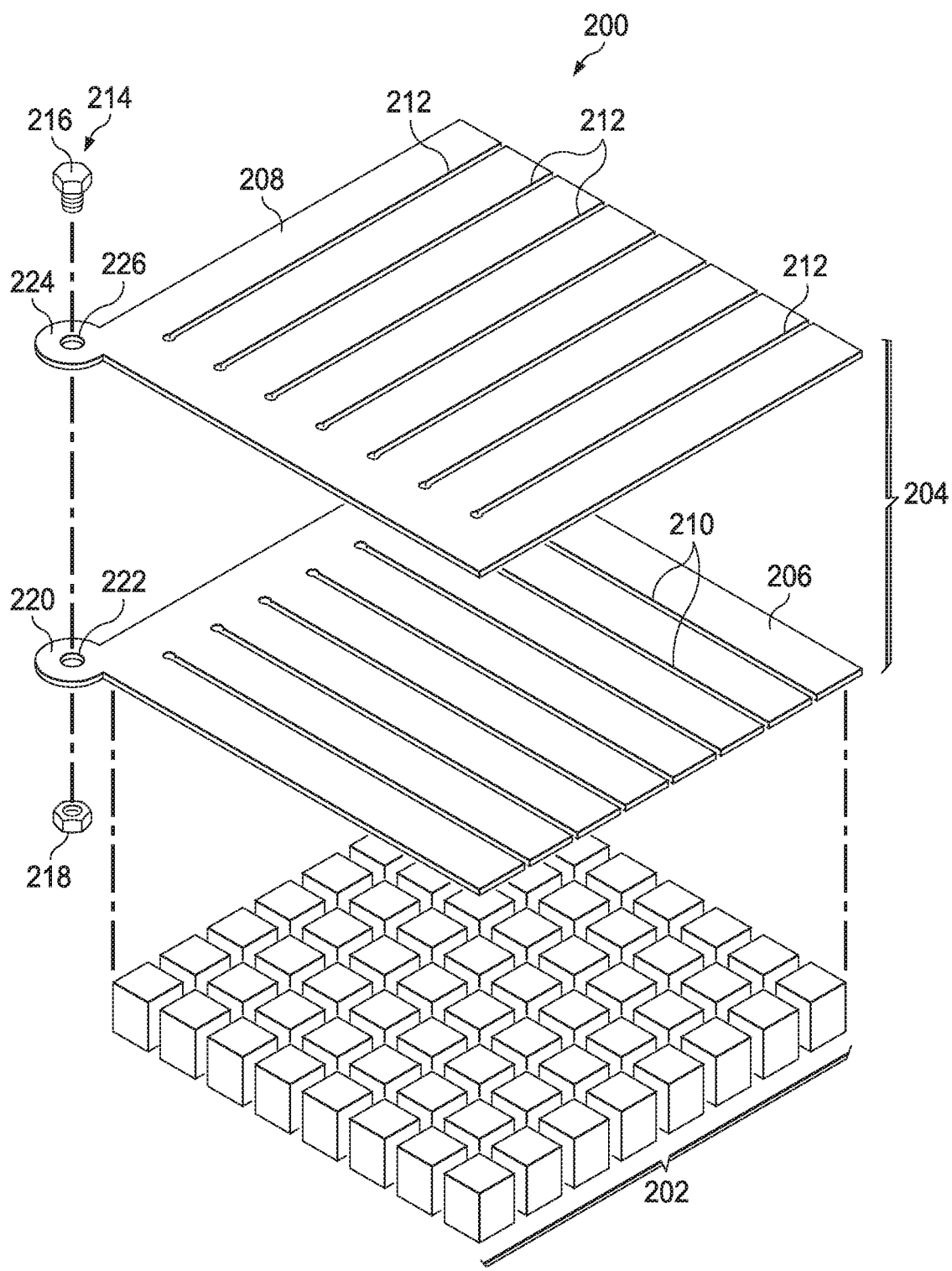
FIG. 2 is an illustration of an exploded perspective view of a magnetic compaction blanket in accordance with an illustrative embodiment.

Turning now to FIG. 2, an illustration of an exploded perspective view of a magnetic compaction blanket is depicted in accordance with an illustrative embodiment. In this example, magnetic compaction blanket 200 is an example of one implementation of magnetic compaction blanket 120 in FIG. 1.

Magnetic compaction blanket 200 comprises plurality of magnets 202 arranged in a desired pattern or configuration. Plurality of magnets 202 are attached to magnetic backplane 204. In this example, magnetic backplane comprises metal sheet 206 and metal sheet 208. Metal sheet 206 may include slits 210 formed therein to improve the flexibility of metal sheet 206. Metal sheet 208 may include slits 212 formed therein to improve the flexibility of metal sheet 208.

Metal sheet 206 may be attached to metal sheet 208 in any appropriate manner to form magnetic backplane 204. For example, metal sheet 206 may be attached to metal sheet 208 such that slits 210 in metal sheet 206 run in a direction that is approximately perpendicular to the direction of slits 212 in metal sheet 208.

For example, without limitation, metal sheet 206 may be attached to metal sheet 208 using fastener 214. Fastener 214 may include bolt 216 and nut 218. Metal sheet 206 may include portion 220 with aperture 222 formed therein. Metal sheet 208 may include portion 224 with aperture 226 formed therein. Metal sheet 208 may be placed adjacent to a surface of metal sheet 206 such that apertures 222 and 226 may be aligned. A threaded portion of bolt 216 then may be extended through aligned apertures 222 and 226. Nut 218 then may be attached to the threaded portion of bolt 216 to join metal sheet 206 to metal sheet 208 to form magnetic backplane 204. In this example, plurality of magnets 202 may be attached in any appropriate manner to a surface of metal sheet 206 opposite the surface thereof on which metal sheet 208 is placed to form magnetic compaction blanket 200.

Figure 3:
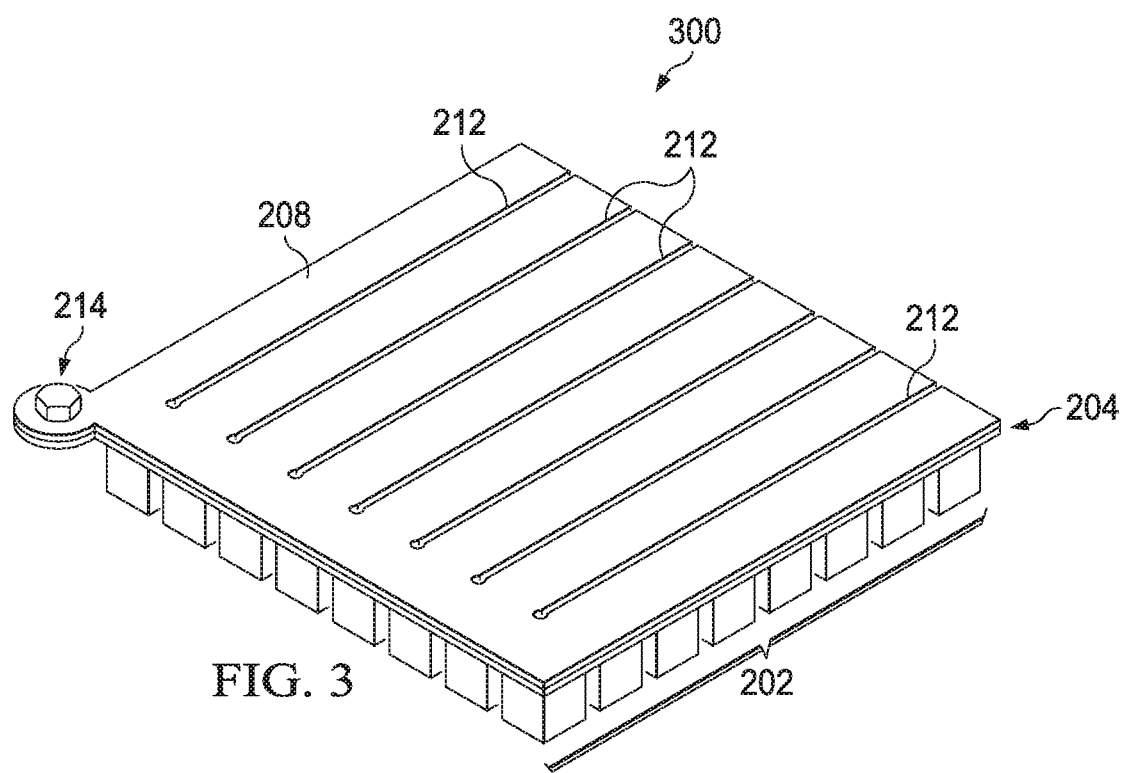
FIG. 3 is an illustration of a perspective view of a magnetic compaction blanket in accordance with an illustrative embodiment.

Turning now to FIG. 3, an illustration of a perspective view of a magnetic compaction blanket is depicted in accordance with an illustrative embodiment. In this example, magnetic compaction blanket 300 is an example of magnetic compaction blanket 200 in FIG. 2 with the various components thereof assembled to form a magnetic compaction blanket in accordance with an illustrative embodiment.

Figure 4:
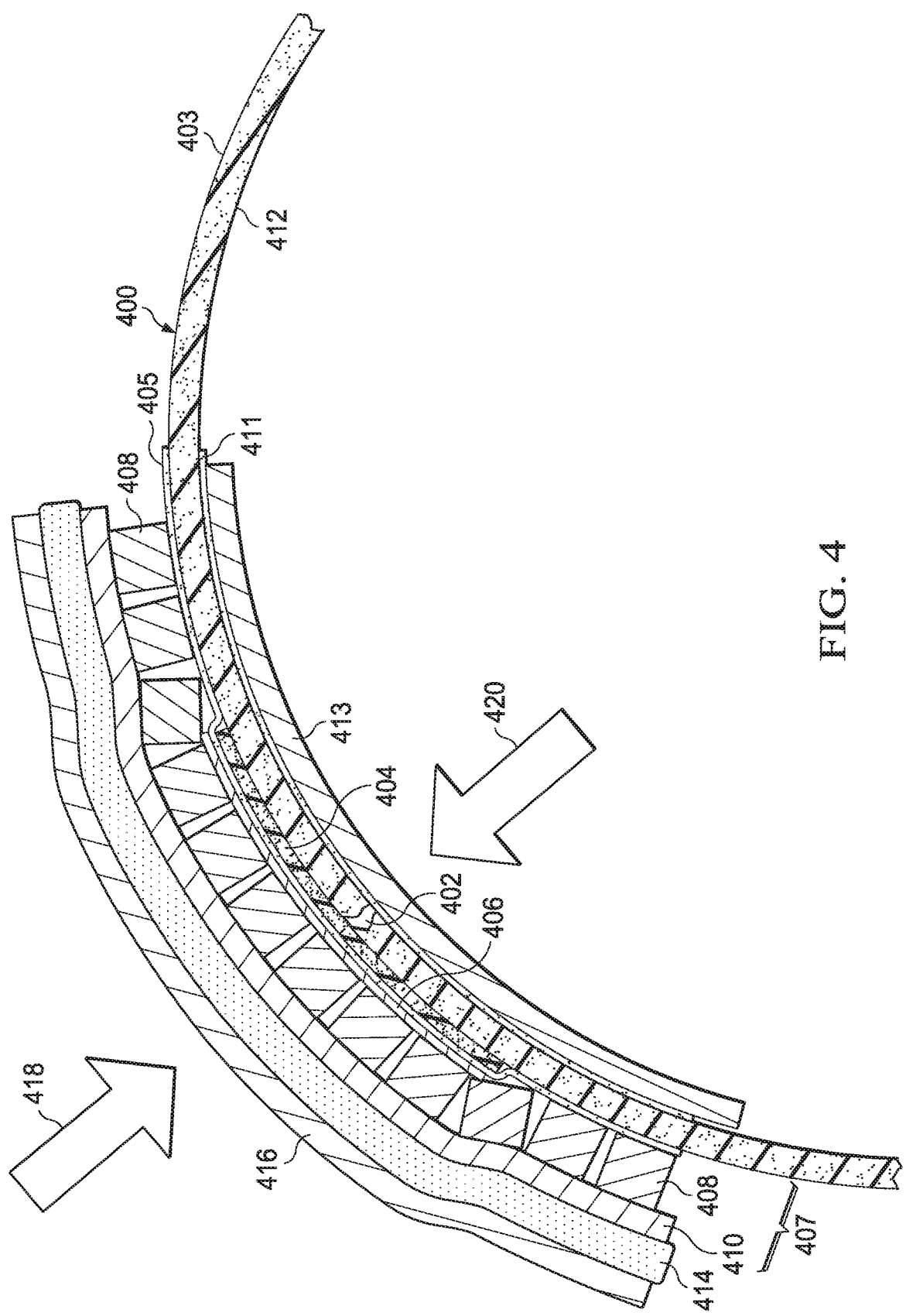
FIG. 4 is an illustration of a cross section showing use of a magnetic compaction blanket for curing a composite structure in accordance with an illustrative embodiment.

Turning now to FIG. 4, an illustration of a cross section showing use of a magnetic compaction blanket for curing a composite structure is depicted in accordance with an illustrative embodiment. In this example, composite structure 400 is an example of one implementation of composite structure 102 in FIG. 1. For example, without limitation, composite structure 400 may be a portion of a duct on an aircraft.

Composite structure 400 may include inconsistency 402. Patch 404 may be placed over inconsistency 402 on first side 403 of composite structure 400 to rework composite structure 400. For example, patch 404 may comprise uncured composite material. Release film 405 may be applied on first side 403 of composite structure 400 over patch 404. Caul sheet 406 may be placed over release film 405 in the area of patch 404.

Magnetic compaction blanket 407 may be placed on first side 403 of composite structure 400 in the area of patch 404. For example, magnetic compaction blanket 407 may be placed on composite structure 400 over caul sheet 406. In this example, magnetic compaction blanket 407 comprises magnets 408 and magnetic backplane 410. For example, magnets 408 may be attached to magnetic backplane 410 to form magnetic compaction blanket 407.

Release film 411 may be applied on second side 412 of composite structure 400. Magnetic compaction structure 413 may be placed on second side 412 of composite structure 400 over release film 411 such that patch 404 is positioned between magnetic compaction blanket 407 and magnetic compaction structure 413. In this example, magnetic compaction structure 413 may comprise a sheet of magnetic material.

Heat blanket 414 may be placed over magnetic backplane 410 of magnetic compaction blanket 407. Heat from heat blanket 414 may be conducted through magnetic compaction blanket 407 to patch 404 to cure patch 404. Magnetic sheet 416 may be placed over heat blanket 414.

In this example, magnetic attraction between magnets 408 in magnetic compaction blanket 407 and magnetic backplane 410, magnetic compaction structure 413, and magnetic sheet 416 may provide desired compaction forces in the directions indicated by arrows 418 and 420 during curing of patch 404.

Figure 5:
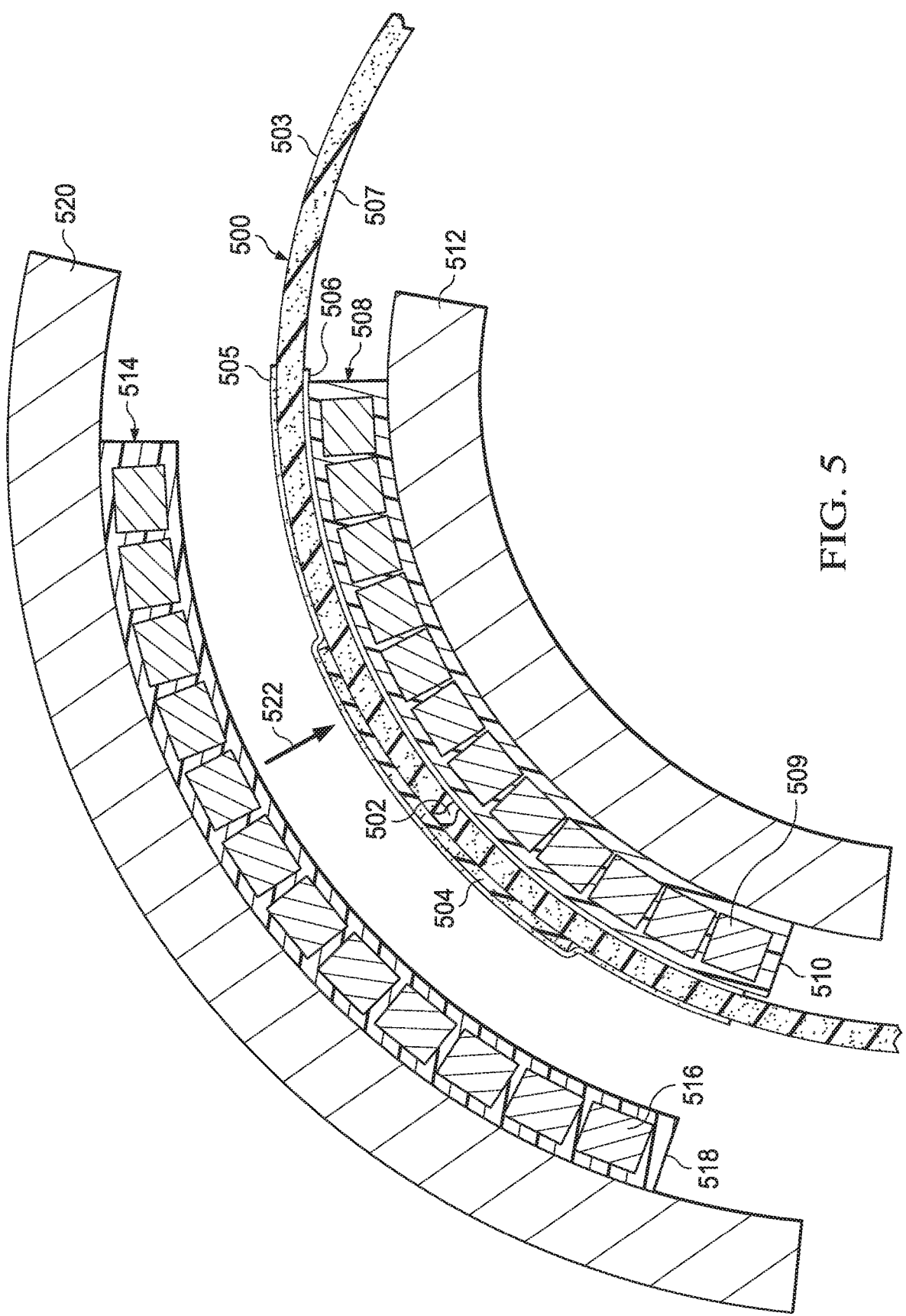
FIG. 5 is an illustration of a cross section showing placement of a magnetic compaction blanket for curing a composite structure in accordance with an illustrative embodiment.

Turning now to FIG. 5, an illustration of a cross section showing placement of a magnetic compaction blanket for curing a composite structure is depicted in accordance with an illustrative embodiment. In this example, composite structure 500 is an example of one implementation of composite structure 102 in FIG. 1. For example, without limitation, composite structure 500 may be a portion of a duct on an aircraft.

Composite structure 500 may include inconsistency 502. Patch 504 may be placed over inconsistency 502 on first side 503 of composite structure 500 to rework composite structure 500. For example, patch 504 may comprise uncured composite material. Release film 505 may be applied on first side 503 of composite structure 500 over patch 504.

Release film 506 may be applied on second side 507 of composite structure 500. Magnetic compaction structure 508 may be placed over release film 506 on second side 507 of composite structure 500 in the area of inconsistency 502. In this example, magnetic compaction structure 508 may comprise a magnetic compaction blanket comprising a plurality of magnets 509 encapsulated in flexible non-magnetic material 510. In this case, magnetic compaction structure 508 may be placed in a position on composite structure 500 using magnetic holder tool 512.

Magnetic compaction blanket 514 may be placed on magnetic holder tool 520. In this example, magnetic compaction blanket 514 may comprise a plurality of magnets 516 encapsulated in flexible non-magnetic material 518. Magnetic compaction blanket 514 may be moved on magnetic holder tool 520 in the direction of arrow 522 to place magnetic compaction blanket 514 over release film 505 on first side 503 of composite structure 500 such that patch 504 is positioned between magnetic compaction blanket 514 and magnetic compaction structure 508.

In one example, without limitation, magnetic compaction blanket 514 may be positioned with respect to magnetic compaction structure 508 such that magnets 516 in magnetic compaction blanket 514 may be aligned with magnets 509 of opposite polarity in magnetic compaction structure 508. Such an alignment of magnets 516 and magnets 509 may improve the magnetic attraction between magnetic compaction blanket 514 and magnetic compaction structure 508, thereby increasing the compaction force applied to patch 504 by magnetic compaction blanket 514.

Figure 6:
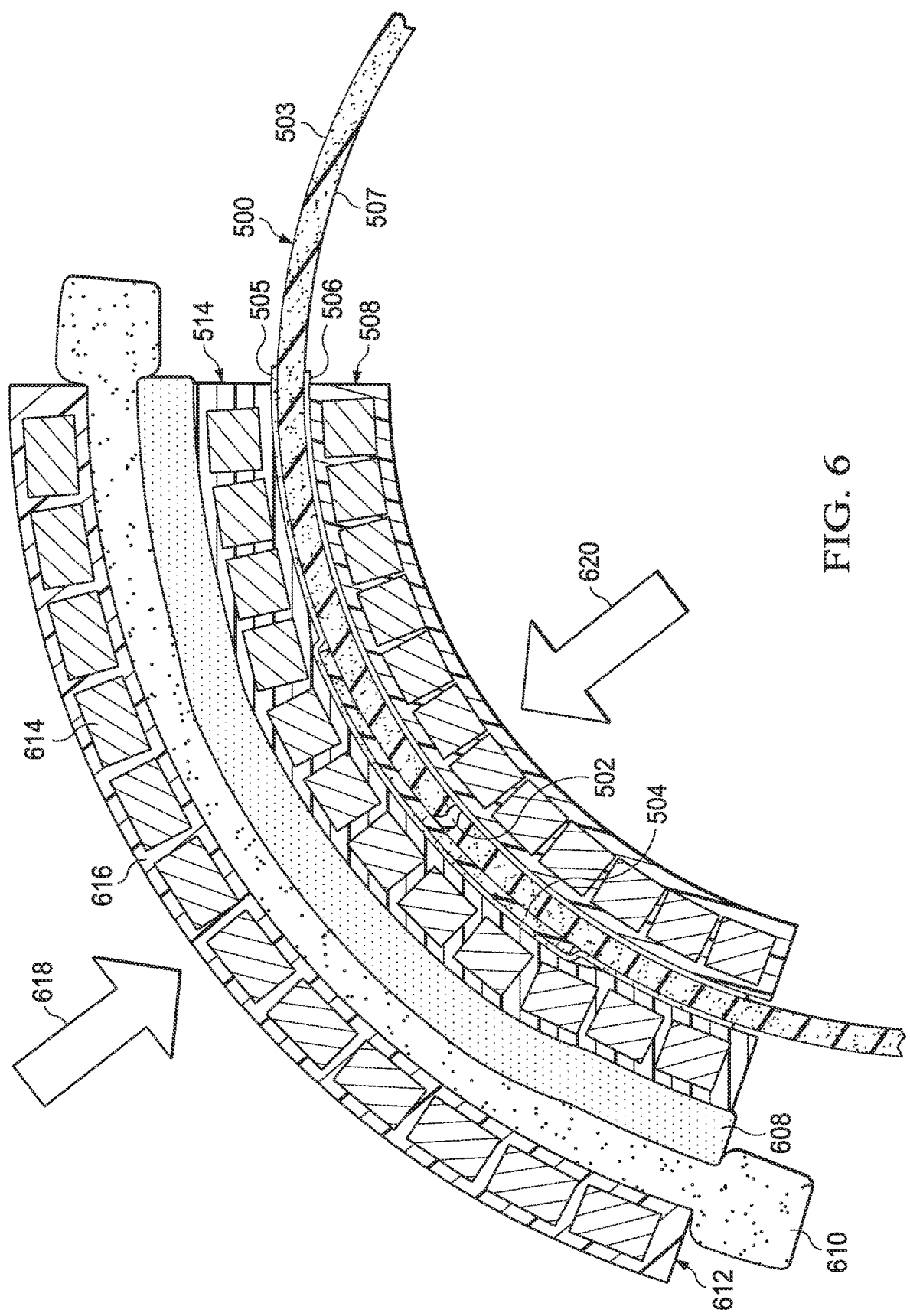
FIG. 6 is an illustration of a cross section showing use of a magnetic compaction blanket for curing a composite structure in accordance with another illustrative embodiment.

Turning now to FIG. 6, an illustration of a cross section showing use of a magnetic compaction blanket for curing a composite structure is depicted in accordance with another illustrative embodiment. In this example, composite structure 500 in FIG. 5 is shown after magnetic holder tool 512 in FIG. 5 is removed from magnetic compaction structure 508 and after magnetic compaction blanket 514 is placed on first side 503 of composite structure 500 and magnetic holder tool 520 in FIG. 5 is removed from magnetic compaction blanket 514.

In this example, heat blanket 608 may be placed over magnetic compaction blanket 514. Heat from heat blanket 608 may be conducted through magnetic compaction blanket 514 to patch 504 to cure patch 504. Insulation 610 may be placed over heat blanket 608. Magnetic compaction blanket 612 may be placed over insulation 610. In this example, magnetic compaction blanket 612 may comprise a plurality of magnets 614 encapsulated in flexible non-magnetic material 616.

In this example, magnetic attraction between magnetic compaction blanket 514, magnetic compaction structure 508, and magnetic compaction blanket 612 may provide desired compaction forces in the directions indicated by arrows 618 and 620 during curing of patch 504.

Figure 7:
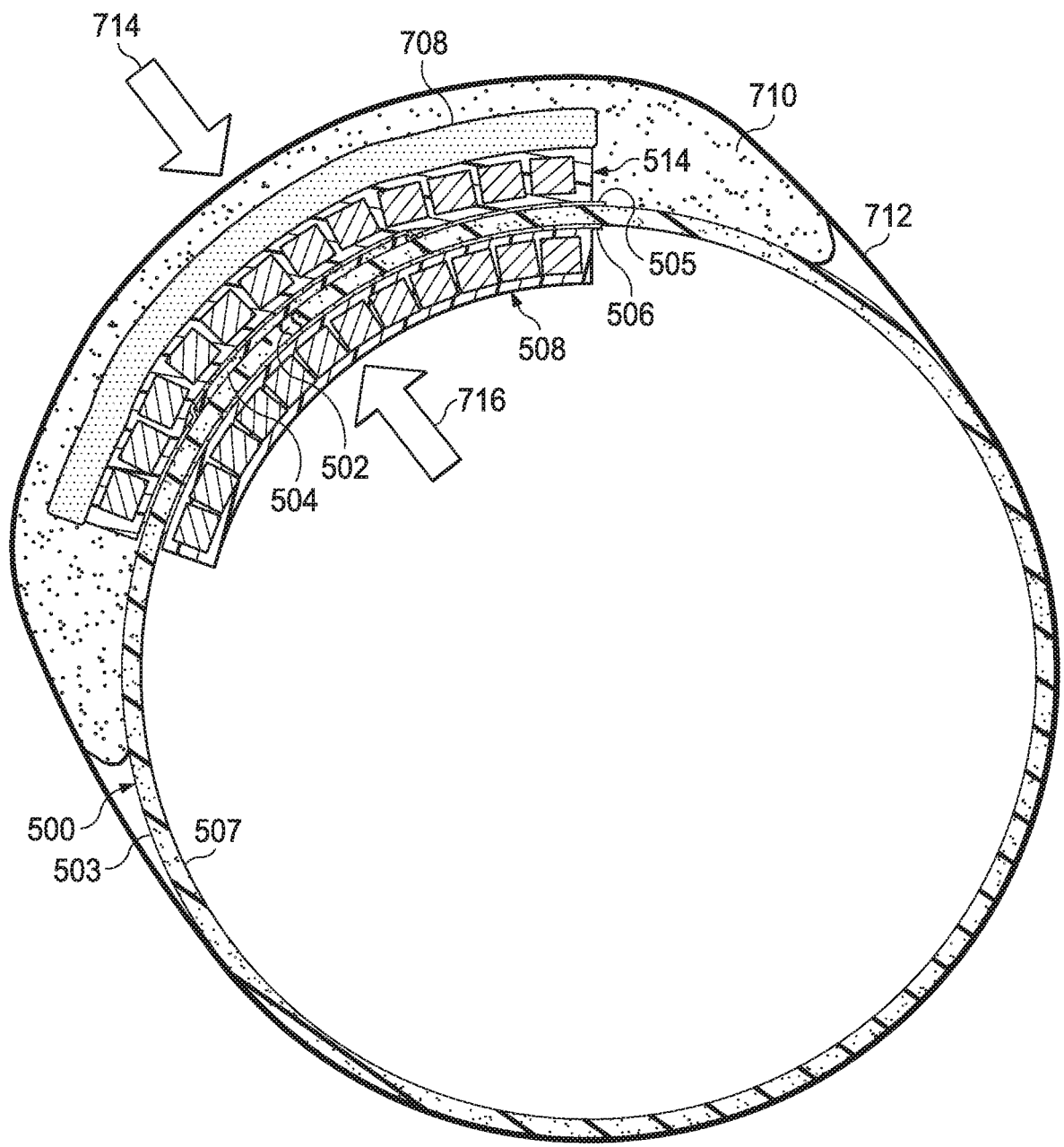
FIG. 7 is an illustration of a cross section showing use of a magnetic compaction blanket for curing a composite structure in accordance with yet another illustrative embodiment.

Turning now to FIG. 7, an illustration of a cross section showing use of a magnetic compaction blanket for curing a composite structure in accordance with yet another illustrative embodiment is depicted in accordance with an illustrative embodiment. In this example, composite structure 500 in FIG. 5 is shown after magnetic holder tool 512 in FIG. 5 is removed from magnetic compaction structure 508 and after magnetic compaction blanket 514 is placed on first side 503 of composite structure 500 and magnetic holder tool 520 in FIG. 5 is removed from magnetic compaction blanket 514.

In this example, heat blanket 708 may be placed over magnetic compaction blanket 514. Heat from heat blanket 708 may be conducted through magnetic compaction blanket 514 to patch 504 to cure patch 504. Insulation 710 may be placed on first side 503 of composite structure 500 such that insulation 710 covers heat blanket 708 and magnetic compaction blanket 514. Compression wrap 712 may be wrapped around first side 503 of composite structure 500 such that insulation 710 is positioned between compression wrap 712 and heat blanket 708.

In this example, magnetic attraction between magnetic compaction blanket 514 and magnetic compaction structure 508 along with compression provided by compression wrap 712 may provide additional desired compaction forces in the directions indicated by arrows 714 and 716 during curing of patch 504.

Figures 8, 9:
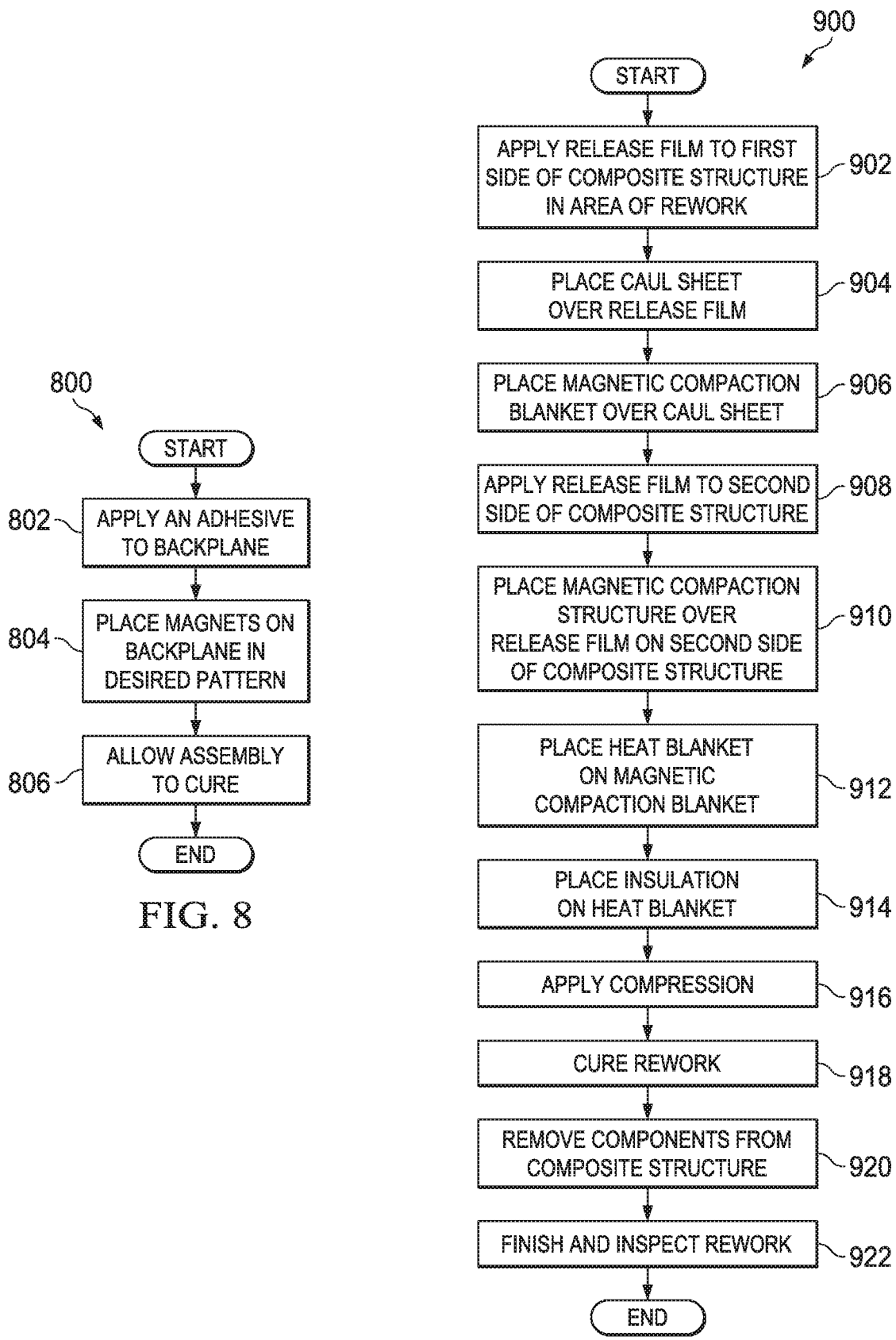
FIG. 8 is an illustration of a flowchart of a process for making a magnetic compaction blanket in accordance with an illustrative embodiment.
FIG. 9 is an illustration of a flowchart of a process for using a magnetic compaction blanket for curing a composite structure in accordance with an illustrative embodiment.

Turning now to FIG. 8, an illustration of a flowchart of a process for making a magnetic compaction blanket is depicted in accordance with an illustrative embodiment. For example, process 800 may be used to make magnetic compaction blanket 120 in FIG. 1.

The process may begin by applying an appropriate adhesive to a surface of a magnetic backplane (operation 802). For example, the magnetic backplane may be made of a flexible metal or other magnetic material. Magnets are then placed in a desired pattern on the surface of the backplane (operation 804). The assembly comprising the magnetic backplane, adhesive, and magnets is allowed to cure (operation 806) so that the adhesive holds the magnets in the desired positions on the magnetic backplane. Magnetic attraction between the magnets and the magnetic backplane will create pressure during curing of the adhesive to assure a desirable bond between the magnets and the backplane. The process terminates thereafter.

Turning now to FIG. 9, an illustration of a flowchart of a process for using a magnetic compaction blanket for curing a composite structure is depicted in accordance with an illustrative embodiment. For example, process 900 may be used in rework environment 100 to rework composite structure 102 in FIG. 1.

The process may begin by applying a release film to a first side of a composite structure in an area of the rework (operation 902). A caul sheet may be placed over the release film on the first side of the composite structure in the area of the rework (operation 904). A magnetic compaction blanket comprising a number of magnets then may be placed on the first side of the composite structure over the caul sheet (operation 906).

A release film also may be applied to a second side of the composite structure (operation 908). A magnetic compaction structure then may be placed over the release film on the second side of the composite structure (operation 910) such that the rework is positioned between the magnetic compaction blanket on the first side of the composite structure and the magnetic compaction structure on the second side of the composite structure. Magnetic attraction between the magnetic compaction blanket and the magnetic compaction structure may pull the magnetic compaction blanket and the magnetic compaction structure toward each other to compact the rework between the magnetic compaction blanket and the magnetic compaction structure.

A heat blanket may be placed over the magnetic compaction blanket on the first side of the composite structure (operation 912) such that the magnetic compaction blanket is between the heat blanket and the rework. Insulation may be placed over the heat blanket (operation 914) such that the heat blanket is between the insulation and the magnetic compaction blanket. Compression may be applied to the heat blanket (operation 916). For example, the compression may be applied to the insulation placed over the heat blanket.

The rework then may be cured (operation 918) by elevating the temperature of the rework using the heat blanket. Heat from the heat blanket may be conducted through the magnetic compaction blanket on the first side of the composite structure to the rework to cure the rework. After curing, the various components placed on the composite structure for compressing and curing the rework may be removed from the composite structure (operation 920). The rework then may be finished as desired and inspected to confirm that the quality of the reworked structure is acceptable (operation 922), with the process terminating thereafter.

When convection heating is used to cure the rework, operations 912, 914, and 916 of process 900 may be replaced by placing the composite structure in a convection oven or other structure for providing heated air or another gas. In this case, heat from the heated gas may be conducted through the magnetic compaction blanket on the first side of the composite structure to the rework to cure the rework.

Embodiments of the disclosure may be described in the context of aerospace vehicle manufacturing and service method 1000 as shown in FIG. 10 and aerospace vehicle 1100 as shown in FIG. 11. Turning first to FIG. 10, an illustration of a block diagram of an aerospace vehicle manufacturing and service method is depicted in accordance with an illustrative embodiment.

During pre-production, aerospace vehicle manufacturing and service method 1000 may include specification and design 1002 of aerospace vehicle 1100 in FIG. 11 and material procurement 1004. During production, component and subassembly manufacturing 1006 and system integration 1008 of aerospace vehicle 1100 in FIG. 11 takes place.

Thereafter, aerospace vehicle 1100 in FIG. 11 may go through certification and delivery 1010 in order to be placed in service 1012.

While in service by a customer, aerospace vehicle 1100 in FIG. 11 is scheduled for routine maintenance and service 1014, which may include modification, reconfiguration, refurbishment, and other maintenance or service. In this example, aerospace vehicle manufacturing and service method 1000 is shown as a method for aerospace vehicles, including manned and unmanned aircraft. The different illustrative embodiments may be applied to other types of manufacturing and service methods, including manufacturing and service methods for other types of platforms, including other types of vehicles.

Each of the processes of aerospace vehicle manufacturing and service method 1000 may be performed or carried out by a system integrator, a third party, an operator, or by any combination of such entities. In these examples, the operator may be a customer. For the purposes of this description, a system integrator may include, without limitation, any number of aerospace vehicle manufacturers and major-system subcontractors; a third party may include, without limitation, any number of vendors, subcontractors, and suppliers; and an operator may be a company, a military entity, a service organization, and so on.

With reference now to FIG. 11, an illustration of a block diagram of an aerospace vehicle in which an illustrative embodiment may be implemented is depicted. In this illustrative example, aerospace vehicle 1100 is produced by aerospace vehicle manufacturing and service method 1000 in FIG. 10. Aerospace vehicle 1100 may include an aircraft, a spacecraft, or any other vehicle for traveling through the air, for traveling through space, or which is capable of operation in both air and space. Aerospace vehicle 1100 may include airframe 1102 with plurality of systems 1104 and interior 1106.

Examples of plurality of systems 1104 include one or more of propulsion system 1108, electrical system 1110, hydraulic system 1112, and environmental system 1114. Illustrative embodiments may be used to rework components used in plurality of systems 1104. For example, without limitation, illustrative embodiments may be used to rework ducts 1116 that may be part of environmental system 1114. Although an aerospace example is shown, different illustrative embodiments may be applied to other industries, such as the automotive industry.

Apparatuses and methods embodied herein may be employed during at least one of the stages of aerospace vehicle manufacturing and service method 1000 in FIG. 10. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 1006 in FIG. 10 may be fabricated or manufactured in a manner similar to components or subassemblies produced while aerospace vehicle 1100 is in service 1012 in FIG. 10.

As yet another example, a number of apparatus embodiments, method embodiments, or a combination thereof may be utilized during production stages, such as component and subassembly manufacturing 1006 and system integration 1008 in FIG. 10. "A number", when referring to items, means one or more items. For example, "a number of apparatus embodiments" is one or more apparatus embodiments. A number of apparatus embodiments, method embodiments, or a combination thereof may be utilized while aerospace vehicle 1100 is in service 1012, during maintenance and service 1014, or both.

The use of a number of the different illustrative embodiments may substantially expedite the assembly of aerospace vehicle 1100. A number of the different illustrative embodiments may reduce the cost of aerospace vehicle 1100. For example, one or more of the different illustrative embodiments may be used during component and subassembly manufacturing 1006, during system integration 1008, or both. The different illustrative embodiments may be used during these parts of aerospace vehicle manufacturing and service method 1000 to rework composite structures that may have undesired inconsistencies.

Further, the different illustrative embodiments also may be implemented during in service 1012, during maintenance and service 1014, or both, to rework inconsistencies that may be discovered in composite structures that may be present in aerospace vehicle 1100. One or more of the different illustrative embodiments may allow for aerospace vehicle 1100 to continue operation with a desired level of performance more quickly.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a support structure;
   a plurality of magnets attached to the support structure and arranged to form a compaction blanket;
   a magnetic compaction structure configured to magnetically attract the compaction blanket with a desired amount of force; and
   a heat source applied on the compaction blanket such that heat is conducted from the heat source to cure a material positioned between the compaction blanket and the magnetic compaction structure;
   wherein the support structure comprises a magnetic backplane and wherein the plurality of magnets is magnetically coupled to the magnetic backplane and is attached to the magnetic backplane by an adhesive.

2. The apparatus of claim 1, wherein the magnetic backplane is flexible.

3. The apparatus of claim 1, wherein the magnetic backplane comprises a material selected from the group of magnetic materials consisting of a metal sheet, a ferromagnetic metal sheet with slits therein, a metal mesh, steel shot, and ferromagnetic powder.

4. The apparatus of claim 1, wherein the plurality of magnets is embedded in a flexible non-magnetic material comprising the support structure.

5. The apparatus of claim 4, wherein the flexible non-magnetic material is silicone.

6. The apparatus of claim 1, wherein the plurality of magnets is selected from the group of permanent magnets consisting of rare-earth magnets, iron-boron neodymium magnets, samarium cobalt magnets, and ferrite magnets.

7. The apparatus of claim 1, wherein the magnetic compaction structure comprises a material selected from the group of magnetic materials consisting of a metal sheet, a metal mesh, and a second compaction blanket.

8. The apparatus of claim 1, wherein the heat source is selected from a heat blanket placed on the compaction blanket and a heated gas.

9. The apparatus of claim 8, wherein the compaction blanket is a first magnetic compaction blanket and the plurality of magnets is a first number of magnets.

10. The apparatus of claim 9,
wherein the heat source is a heat blanket; and further comprising:
a magnetic sheet positioned such that the heat blanket is between the magnetic sheet and the first magnetic compaction blanket and magnetic attraction between the magnetic sheet and the first magnetic compaction blanket pulls the magnetic sheet toward the first magnetic compaction blanket to compress the heat blanket between the magnetic sheet and the first magnetic compaction blanket.

11. The apparatus of claim 9,
wherein the heat source is a heat blanket; and further comprising:
a compression wrap positioned such that the heat blanket is between the compression wrap and the first magnetic compaction blanket and the compression wrap compresses the heat blanket between the compression wrap and the first magnetic compaction blanket.

12. The apparatus of claim 9,
wherein the heat source is a heat blanket; and further comprising:
a second magnetic compaction blanket comprising a second number of magnets positioned such that the heat blanket is between the second magnetic compaction blanket and the first magnetic compaction blanket and magnetic attraction between the second magnetic compaction blanket and the first magnetic compaction blanket pulls the second magnetic compaction blanket toward the first magnetic compaction blanket to compress the heat blanket between the second magnetic compaction blanket and the first magnetic compaction blanket.

13. The apparatus of claim 1, further comprising:
a magnetic holder tool having the compaction blanket placed thereon, wherein the magnetic holder tool is configured to place the compaction blanket on the material and to be removed from the compaction blanket after placing the compaction blanket on the material.

14. An apparatus comprising:
a support structure;
a plurality of magnets attached to the support structure and arranged to form a compaction blanket;
a magnetic compaction structure configured to magnetically attract the compaction blanket with a desired amount of force; and
a heat source applied on the compaction blanket such that heat is conducted from the heat source to cure a material positioned between the compaction blanket and the magnetic compaction structure;
wherein the plurality of magnets is embedded in a flexible non-magnetic material comprising the support structure.

15. The apparatus of claim 14, wherein the support structure comprises a flexible magnetic backplane.

16. The apparatus of claim 14, wherein the heat source is selected from a heat blanket placed on the compaction blanket and a heated gas.

17. An apparatus comprising:
a support structure;
a plurality of magnets attached to the support structure and arranged to form a compaction blanket;
a magnetic compaction structure configured to magnetically attract the compaction blanket with a desired amount of force;
a heat source applied on the compaction blanket such that heat is conducted from the heat source to cure a material positioned between the compaction blanket and the magnetic compaction structure; and
a magnetic holder tool having the compaction blanket placed thereon, wherein the magnetic holder tool is configured to place the compaction blanket on the material and to be removed from the compaction blanket after placing the compaction blanket on the material.

18. An apparatus comprising:
a support structure;
a plurality of magnets attached to the support structure and arranged to form a compaction blanket;
a magnetic compaction structure configured to magnetically attract the compaction blanket with a desired amount of force; and
a heat source applied on the compaction blanket such that heat is conducted from the heat source to cure a material positioned between the compaction blanket and the magnetic compaction structure;
wherein the compaction blanket is a first magnetic compaction blanket, the plurality of magnets is a first number of magnets, and the heat source is a heat blanket; and
a magnetic sheet positioned such that the heat blanket is between the magnetic sheet and the first magnetic compaction blanket and magnetic attraction between the magnetic sheet and the first magnetic compaction blanket pulls the magnetic sheet toward the first magnetic compaction blanket to compress the heat blanket between the magnetic sheet and the first magnetic compaction blanket.

19. An apparatus comprising:
a support structure;
a plurality of magnets attached to the support structure and arranged to form a compaction blanket;
a magnetic compaction structure configured to magnetically attract the compaction blanket with a desired amount of force; and a heat source applied on the compaction blanket such that heat is conducted from the heat source to cure a material positioned between the compaction blanket and the magnetic compaction structure;

wherein the compaction blanket is a first magnetic compaction blanket, the plurality of magnets is a first number of magnets, and the heat source is a heat blanket; and a compression wrap positioned such that the heat blanket is between the compression wrap and the first magnetic compaction blanket and the compression wrap compresses the heat blanket between the compression wrap and the first magnetic compaction blanket.

20. An apparatus comprising:

a support structure;

a plurality of magnets attached to the support structure and arranged to form a compaction blanket;

a magnetic compaction structure configured to magnetically attract the compaction blanket with a desired amount of force; and a heat source applied on the compaction blanket such that heat is conducted from the heat source to cure a material positioned between the compaction blanket and the magnetic compaction structure;

wherein the compaction blanket is a first magnetic compaction blanket, the plurality of magnets is a first number of magnets, and the heat source is a heat blanket; and a second magnetic compaction blanket comprising a second number of magnets positioned such that the heat blanket is between the second magnetic compaction blanket and the first magnetic compaction blanket and magnetic attraction between the second magnetic compaction blanket and the first magnetic compaction blanket pulls the second magnetic compaction blanket toward the first magnetic compaction blanket to compress the heat blanket between the second magnetic compaction blanket and the first magnetic compaction blanket.

* * * * *